United States Patent
Lais et al.

(10) Patent No.: US 10,845,222 B2
(45) Date of Patent: Nov. 24, 2020

(54) SENSOR ASSEMBLY FOR A SENSOR, SENSOR, AS WELL AS MEASURING SYSTEM FORMED THEREWITH

(71) Applicant: Endress + Hauser Flowtec AG, Reinach (CH)

(72) Inventors: Christian Lais, Munchenstein (CH); Andreas Strub, Weil am Rhein (DE); Dominique Wiederkehr, Hagenthal-le-bas (FR)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 303 days.

(21) Appl. No.: 15/761,472

(22) PCT Filed: Sep. 8, 2016

(86) PCT No.: PCT/EP2016/071147
§ 371 (c)(1),
(2) Date: Mar. 20, 2018

(87) PCT Pub. No.: WO2017/050583
PCT Pub. Date: Mar. 30, 2017

(65) Prior Publication Data
US 2018/0266857 A1    Sep. 20, 2018

(30) Foreign Application Priority Data
Sep. 24, 2015   (DE) .................. 10 2015 116 147

(51) Int. Cl.
*G01F 1/32*   (2006.01)
*G01F 15/10*  (2006.01)

(52) U.S. Cl.
CPC .......... *G01F 1/3209* (2013.01); *G01F 1/3263* (2013.01); *G01F 15/10* (2013.01)

(58) Field of Classification Search
CPC . G01F 1/20; G01F 1/32; G01F 1/3209; G01F 1/3245; G01F 1/3263; G01F 15/10
(Continued)

(56) References Cited

U.S. PATENT DOCUMENTS

| 3,608,374 A | 9/1971 | Miller |
| 4,803,870 A | 2/1989 | Lew |

(Continued)

FOREIGN PATENT DOCUMENTS

| CN | 2433596 Y | 6/2001 |
| CN | 104568023 A | 4/2015 |

(Continued)

OTHER PUBLICATIONS

Chinese Office Action issued in corresponding Chinese Application No. 201680055212.7, dated May 10, 2019.
(Continued)

*Primary Examiner* — Benjamin R Schmitt
(74) *Attorney, Agent, or Firm* — Bacon & Thomas, PLLC (57) ABSTRACT

A sensor assembly has a deformation body having two oppositely lying surfaces and an outer edge segment as well as a sensor blade extending from the surface to a distal end and having a left side, first lateral surface and a right side, second lateral surface. An overload protection apparatus protects the deformation body against plastic deformation and has a support stirrup led with lateral separation around the sensor blade and a first stop and a second stop located on opposite sides of the sensor blade. The stops are so arranged that an intermediate space formed therebetween receives only a portion of the sensor blade. The deformation body and the sensor blade are excitable to oscillate about a shared static resting position and to be moved in such a manner that the sensor blade executes pendulum-like movements elastically deforming the deformation body.

31 Claims, 7 Drawing Sheets

(58) Field of Classification Search
USPC .............. 73/861.18, 861.21, 861.22, 861.24
See application file for complete search history.

(56) References Cited

U.S. PATENT DOCUMENTS

| | | |
|---|---|---|
| 4,986,134 A | 1/1991 | Lew |
| 5,197,336 A | 3/1993 | Tsuruoka et al. |
| 5,313,843 A | 5/1994 | Tsuruoka et al. |
| 6,276,218 B1 | 8/2001 | Waers |
| 2003/0061887 A1 | 4/2003 | Koudal et al. |
| 2011/0154913 A1 | 6/2011 | Konyukhov et al. |

FOREIGN PATENT DOCUMENTS

| | | |
|---|---|---|
| DE | 28 09 254 A1 | 9/1978 |
| DE | 38 18 417 A1 | 12/1989 |
| DE | 40 36 869 A1 | 5/1992 |
| DE | 43 16 067 A1 | 11/1994 |
| DE | 102 49 543 A1 | 5/2004 |
| DE | 10249543 A1 | 5/2004 |
| DE | 10 2015 116 147 A1 | 3/2017 |
| JP | H1038725 A | 2/1998 |
| WO | 2004/038344 A1 | 5/2004 |
| WO | 2014/187629 A1 | 11/2014 |
| WO | 2017/050583 A1 | 3/2017 |

OTHER PUBLICATIONS

6erman Search Report, German PTO, Munich, dated May 4, 2016.
International Search Report, EPO, The Netherlands, dated Dec. 22, 2016.

SENSOR ASSEMBLY FOR A SENSOR, SENSOR, AS WELL AS MEASURING SYSTEM FORMED THEREWITH

TECHNICAL FIELD

The invention relates to a sensor assembly having a deformation body, especially a membrane like and/or disk shaped deformation body, as well as a sensor blade extending from a surface of the deformation body. Furthermore, the invention relates to a sensor formed by means of such a sensor assembly, and to a measuring system formed with the sensor, and to its application for registering pressure fluctuations in a flowing fluid and/or for measuring at least one flow parameter of a fluid flowing in a pipeline.

BACKGROUND DISCUSSION

Often used in process measurements—and automation technology for measuring flow velocities of fluids flowing in pipelines, especially rapidly flowing, and/or hot, gases and/or fluid flows of high Reynolds number (Re), or of volume— or mass flow rates with corresponding flow velocities (u) are measuring systems embodied as vortex flow measuring devices. Examples of such measuring systems are known from, among others, US-A 200610230841, US-A 2008/0072686, US-A 2011/0154913, US-A 2011/0247430, U.S. Pat. Nos. 6,003,384, 6,101,885, 6,352,000, 6,910,387 or 6,938,496 and are, among others, also offered by the applicant, for example, under the designations "PROWIRL D 200", "PROWIRL F 200", "PROWIRL O 200", "PROWIRL R 200".

Such measuring systems involve a bluff body protruding into the lumen of a pipeline in the form, for example, of a component of a heat supply network or a turbine circulatory system, or into a lumen of a measuring tube installed in the course of the pipeline. The bluff body is flowed against by the fluid, resulting in vortices aligned to form a so-called Kármán vortex street within the volume portion of the fluid flowing directly downstream of the bluff body. The vortices are, as is known, generated on the bluff body with a shedding rate $(1/fv_{Ex})$ dependent on the flow velocity of the fluid flowing in a principal flow direction through the measuring tube.

Furthermore, the measuring systems have a sensor integrated in the bluff body, or connected with such or protruding downstream of the same, namely into the region of the Karman vortex street, into the flow, consequently into the lumen of the measuring tube. The sensor serves to register pressure fluctuations in the Kármán vortex street formed in the flowing fluid and to transduce such into a sensor signal representing the pressure fluctuations, namely to deliver a signal—, for example, an electrical or optical—signal, which corresponds to a pressure reigning within the fluid and subjected to periodic fluctuations as a result of vortices of opposites sense moving downstream of the bluff body. The sensor signal has a signal frequency $(\sim fv_{Ex})$ corresponding to the shedding rate of the vortices.

The sensor includes a sensor assembly formed by means of a deformation body—most often formed as a thin and essentially flat membrane—as well as a sensor blade—most often a plate-shaped, or wedge shaped, sensor blade— extending from an essentially planar surface of the deformation body and adapted to register pressure fluctuations in the Kármán vortex street acting in a detection direction transverse to the actual principal flow direction, namely to transduce such into movements of the deformation body corresponding to the pressure fluctuations, in such a manner that the sensor blade, as a result of the pressure fluctuations, executes pendulum-like movements in the detection direction, which deform the deformation body elastically, whereby deformation body and sensor blade are excited to execute forced oscillations about a shared static resting position. The deformation body includes, furthermore, a—most often annular—external edge segment, which is adapted to be connected, with hermetic sealing, for example, by material bonded connection, with a seat serving for mounting the deformation body, and the sensor formed therewith, to a wall of a tube, in such a manner that the deformation body covers and hermetically seals an opening provided in the wall of the tube and that the surface of the deformation body carrying the sensor blade faces the fluid conveying lumen of the measuring tube, or of the pipeline. Thus, the sensor blade protrudes inwardly into the lumen. Since the deformation body is embodied typically membrane like, or disc shaped, a thickness of the inner segment of the deformation body carrying the sensor blade, equally as well bounded by the outer edge segment, is most often very much less than a greatest diameter of a surface of the segment bounded by the outer edge segment. In order to achieve a sufficiently high measuring sensitivity, namely a sufficiently high sensitivity of the sensor to the pressure fluctuations to be registered, deformation bodies of established measuring systems have typically a corresponding diameter to thickness ratio, which lies, for instance, in the order of magnitude of 20:1. As shown, for instance, in the above referenced U.S. Pat. No. 6,352,000, sensor assemblies of the previously indicated type can have, at times, additionally, a balancing body, most often a rod-, plate- or shell shaped balancing body, extending from a surface of the deformation body facing away from the surface carrying the sensor blade. The balancing body serves, especially, to compensate forces, and moments resulting from movements of the sensor assembly, for example, as a result of vibrations of the pipeline, and to prevent undesired movements of the sensor blade resulting therefrom.

For the purpose of generating the sensor signal, the sensor comprises, furthermore, a corresponding transducer element, for example, a transducer element formed by means of a capacitor mechanically coupled with the sensor assembly, or integrated therein, or one formed by means of a piezo-stack serving as piezoelectric transducer. The transducer element is adapted to register movements of the deformation body, or of the, in given cases, present, balancing body, corresponding to pressure fluctuations and to modulate an electrical or optical carrier signal accordingly.

The sensor assembly, i.e. the sensor formed therewith, is connected on a side facing away from the fluid conveying lumen, furthermore, with a transmitter electronics, typically a pressure- and shock resistantly encapsulated, in given cases, also outwardly hermetically sealed, transmitter electronics. Transmitter electronics of industrial grade measuring systems have usually a corresponding digital measuring circuit electrically connected with the transducer element via connecting lines, in given cases, with interposed electrical barriers and/or galvanic separation locations, for processing the at least one sensor signal produced by the transducer element and for producing digital measured values for the measured value to be registered in each case, namely flow velocity, volume flow rate and/or mass flow rate. The transmitter electronics of industrially usable measuring systems established in industrial measurements technology are usually accommodated in a protective housing of metal and/or shock resistant synthetic material and additionally most often also have external interfaces conforming to an industrial standard, for example, DIN IEC 60381-1, for communication with superordinated measuring—and/or control systems, for example, formed by means of programmable logic controllers (PLC). Such an external interface can be embodied, for example, as a two-conductor connection of an electrical current loop and/or some other interface compatible with established industrial fieldbuses.

Particularly due to the relatively high diameter to thickness ratios of the deformation body resulting from the principle of measurement, conventional sensors of the type being discussed—in the case of application of a high strength nickel based alloy, such as e.g. Inconel 718 (Special Metals Corp.), as material for the deformation body—can most often have a pressure limit, namely a maximum permitted operating pressure, above which a nonreversible plastic deformation of the sensor, especially its deformation body, can occur. This pressure limit can be too low for the extremely high pressures, at times, actually occurring in certain applications. The situation can be such that even in the case of only momentary, for instance impulse like, overloading, the integrity of the respective measuring system, and the declared accuracy of measurement, can no longer be assured. This, for instance, also in the (hot-) steam treatments with fluid temperatures of above 400° C. actually to be expected for the principle of measurement being discussed, in the case of which, for example, so-called condensation induced, water hammers (CIWH) in the region of the sensor can lead not only to extremely high dynamic pressures of above 140 bar, but, also, at times, to very non-uniform, asymmetric, pressure distributions within the fluid to be measured, in such a manner that the pressure fluctuations then acting on the sensor blade, measured in the detection direction, have peak values of greater than 20 bar, and, as a result, to an increased degree, corresponding irreversible deformations of the sensor assembly, along with a failure of the measuring system, are to be observed in such applications.

SUMMARY OF THE INVENTION

Based on the above, an object of the invention is to improve the construction of sensor assemblies of the type being discussed, especially sensors formed therewith, such that, as a result, they have a higher pressure resistance, and a dependence of the pressure resistance on the operating temperature enabling use in hot steam treatments with steam temperatures of above 400 C and, at times, impulse like, changing pressures with pressure spikes of above 140 bar.

For achieving the object, the invention resides in a sensor assembly for a sensor, for example, a sensor for registering pressure fluctuations in a Kármán vortex street formed in a flowing fluid, which sensor assembly comprises:
 a deformation body, for example, a membrane like and/or disk shaped, deformation body, having a first surface, an oppositely lying, second surface, for example, a second surface at least partially parallel to the first surface, and an outer edge segment, for example, an annular outer edge segment and/or an outer edge segment provided with a sealing surface;
 a sensor blade extending from the first surface of the deformation body to a distal end, for example, a plate-shaped, or wedge shaped, sensor blade, having a left side, first lateral surface and a right side, second lateral surface;
 as well as an overload protection apparatus extending from the edge segment of the deformation body to a distal end and serving for protection of the deformation body against plastic, i.e. irreversible, deformation, with a support stirrup led with lateral separation around the sensor blade as well as two stops held by the support stirrup for limiting movement of the sensor blade, of which a first stop is located on the left side of the sensor blade and a second stop is located on the right side of the sensor blade.

The stops of the sensor assembly of the invention are additionally so dimensioned and so arranged that an intermediate space formed therebetween receives only a portion of the sensor blade, for example, an edge located portion of the sensor blade.

The deformation body and the sensor blade of the sensor assembly of the invention are, in turn, adapted to be excited to execute oscillations for example, forced oscillations, about a shared static resting position and, in such case, to be moved relative to the overload protection apparatus, in such a manner that the sensor blade executes pendulum-like movements elastically deforming the deformation body, in the case of which the portion of the sensor blade located within the intermediate space is moved alternately to the left, namely in the direction toward the first stop, and to the right, namely in the direction toward the second stop.

Moreover, the invention resides in a sensor for registering pressure fluctuations in a flowing fluid, for example, for registering pressure fluctuations in a Kármán vortex street formed in the flowing fluid, which sensor comprises such a sensor assembly as well as a transducer element for generating a sensor signal, for example, an electrical or optical, sensor signal, representing movements of the sensor blade changing as a function of time, for example, at least at times periodic movements of the sensor blade, and/or deformations of the deformation body changing as a function of time, for example, at least at times periodic deformations of the deformation body.

Furthermore, the invention resides in a measuring system for measuring at least one flow parameter, for example, a flow parameter changeable as a function of time, for example, a flow velocity and/or a volume flow rate, of a fluid flowing in a pipeline, which measuring system comprises a sensor for registering pressure fluctuations in the flowing fluid, for example, for registering pressure fluctuations in a Kármán vortex street formed in the flowing fluid, as well as a measuring electronics, which is adapted to receive the sensor signal and to process such, for example, to generate measured values representing the at least one flow parameter.

A further aspect the invention is use of such a measuring system for measuring a flow parameter—, for example, a flow velocity and/or a volume flow rate and/or a mass flow rate—of a fluid, for example, a vapor or steam, flowing in a pipeline, for example, a fluid having at least at times a temperature of greater than 400° C. and/or at least at times acting with a pressure of greater than 140 bar on the deformation body and/or the sensor blade of the sensor.

In a first embodiment of the sensor assembly of the invention, it is provided that the overload protection apparatus has a connecting element, for example, an annular connecting element, on one end facing the edge segment of the deformation body.

Developing this embodiment of the invention, it is, furthermore, provided that the connecting element as well as the support stirrup are integral components of one and the same monolithic, formed part. Alternatively, support stirrup and connecting element can, for example, be connected or joined together by material bonding, for example, welded together.

Moreover, the connecting element, the overload protection apparatus and the edge segment of the deformation body can, for example, be connected or joined together by material bonding, for example, welded together.

In a second embodiment of the sensor assembly of the invention, it is provided that deformation body, sensor blade and overload protection apparatus are so dimensioned and arranged that, in the case of sensor blade located together with the deformation body in shared static resting position, the sensor blade contacts neither the support stirrup nor either of the stops.

In a third embodiment of the sensor assembly of the invention, it is provided that deformation body, sensor blade and overload protection apparatus are so dimensioned and arranged that, in the case of sensor blade together with the deformation body located in shared static resting position, gaps are formed between the sensor blade and each of the two stops, for example, in such a manner that each of the gaps has a minimum gap breadth, which is greater than 0.02 mm and/or less than 0.2 mm, and/or that the sensor blade contacts neither of the stops.

In a fourth embodiment of the sensor assembly of the invention, it is provided that deformation body, sensor blade and overload protection apparatus are so dimensioned and arranged that, in the case of sensor blade together with the deformation body located in shared static resting position, a gap is formed between the sensor blade and the support stirrup, for example, in such a manner that the gap has a minimum gap breadth, which is greater than 0.02 mm and/or that the sensor blade is not contacted by the support stirrup.

In a fifth embodiment of the sensor assembly of the invention, it is provided that deformation body, sensor blade and overload protection apparatus are so dimensioned and arranged that, in the case of sensor blade together with the deformation body located in a shared first end position differing from the shared static resting position, the sensor blade contacts the first stop, but, for example, does not contact the support stirrup.

Developing this embodiment of the invention, it is, furthermore, provided that deformation body, sensor blade and overload protection apparatus are so dimensioned and arranged that, in the case of sensor blade together with the deformation body in a shared second end position differing from the shared static resting position as well as also from the shared first end position, the sensor blade contacts the second stop, but, for example, does not contact the support stirrup.

Moreover, the deformation body, the sensor blade and the overload protection apparatus are, furthermore, so dimensioned and arranged that both a deformation of the deformation body corresponding to the first end position as well as also a deformation of the deformation body corresponding to the second end position are only elastic, for example, linearly-elastic, thus the deformation of the deformation body is not plastic.

In a sixth embodiment of the sensor assembly of the invention, it is provided that the sensor blade has a projection, for example, a terminal and/or pin-shaped projection, and that deformation body, sensor blade and overload protection apparatus are so dimensioned and arranged that the projection protrudes inwardly into the intermediate space formed between the stops.

Developing this embodiment of the invention, it is, furthermore, provided that the stops are provided by edge segments of a recess in the support stirrup, for example, a recess formed as a passageway or bore, and the intermediate space is formed by a lumen of the recess surrounded by the edge segments.

In a seventh embodiment of the sensor assembly of the invention, it is provided that the support stirrup is led at least partially on a left side of the sensor blade.

In an eighth embodiment of the sensor assembly of the invention, it is provided that the support stirrup is conveyed at least partially on a right side of the sensor blade.

In a ninth embodiment of the sensor assembly of the invention, it is provided that the support stirrup is led at least partially on a front side of the sensor blade.

In a tenth embodiment of the sensor assembly of the invention, it is provided that the support stirrup is led at least partially on a rear side of the sensor blade.

In an eleventh embodiment of the sensor assembly of the invention, it is provided that the overload protection apparatus is formed by means of a single, monolithic, formed part.

In a twelfth embodiment of the sensor assembly of the invention, it is provided that the first stop, the second stop as well as the support stirrup are integral components of one and the same monolithic, formed part.

In a thirteen embodiment of the sensor assembly of the invention, it is provided that the stops are formed at least partially by edge segments of a recess provided in the support stirrup.

In a fourteenth embodiment of the sensor assembly of the invention, it is provided that the intermediate space is formed at least partially by a lumen of a recess provided in the support stirrup.

In a fifteenth embodiment of the sensor assembly of the invention, it is provided that the overload protection apparatus is composed at least partially, for example, predominantly or completely, of a metal, for example, a stainless steel, or a nickel based alloy.

In a sixteenth embodiment of the sensor assembly of the invention, it is provided that deformation body and overload protection apparatus are composed of the same material.

In a seventeenth embodiment of the sensor assembly of the invention, it is provided that deformation body and overload protection apparatus components are one and the same, monolithic, formed part for example, a cast monolithic part or one manufactured by 3D laser melting.

In an eighteenth embodiment of the sensor assembly of the invention, it is provided that deformation body and overload protection apparatus are connected together by material bonding, for example, welded, brazed or soldered together.

In a nineteenth embodiment of the sensor assembly of the invention, it is provided that deformation body and sensor blade are connected together by material bonding, for example, welded, brazed or soldered together.

In a twentieth embodiment of the sensor assembly of the invention, it is provided that the outer edge segment is adapted to be connected, for example, by material bonding and/or hermetically sealed, to a seat serving for mounting the deformation body on a wall of a tube, for example, in such a manner that the deformation body covers, for example, hermetically seals, an opening provided in the wall of the tube, and/or in such a manner that the first surface of the deformation body faces a lumen of the tube, such that the sensor blade protrudes inwardly into the lumen In a twenty first embodiment of the sensor assembly of the invention, it is provided that at least one sealing surface, for example, a surrounding and/or an annular like sealing surface, is embodied in the outer edge segment.

In a twenty second embodiment of the sensor assembly of the invention, it is provided that the deformation body is at least partially, for example, predominantly or completely, composed of a metal, for example, a stainless steel, or a nickel based alloy.

In a twenty third embodiment of the sensor assembly of the invention, it is provided that the sensor blade is at least partially, for example, predominantly or completely, composed of a metal, for example, a stainless steel, or a nickel based alloy.

In a twenty fourth embodiment of the sensor assembly of the invention, it is provided that deformation body and sensor blade are composed of the same material.

In a twenty fifth embodiment of the sensor assembly of the invention, it is provided that deformation body and sensor blade are components of one and the same, monolithic, formed part, for example, a casting or a part manufactured by 3D laser melting.

In a twenty-sixth embodiment of the sensor assembly of the invention, it is provided that the support stirrup is U-shaped. Alternatively, the support stirrup can have, for example, also a V-shape or an L-shape.

In a first embodiment of the measuring system of the invention, it is provided that an opening is embodied in the wall of the tube, for example, an opening having a seat serving for mounting the deformation body on the wall, and that the sensor is inserted into the opening in such a manner that the deformation body covers the opening, for example, hermetically seals such, and that the first surface of the deformation body faces the lumen of the tube, such that the sensor blade protrudes inwardly into the lumen.

Developing this embodiment of the invention, it is, furthermore, provided that the opening has a seat serving for mounting the deformation body on the wall. Embodied in the seat, furthermore, can be at least one sealing surface, for example, a surrounding sealing surface and/or an annular like, sealing surface. Moreover, additionally embodied in the edge segment can be at least one sealing surface, for example, a surrounding sealing surface and/or an annular like, sealing surface, and the sealing surface as well as the sealing surface of the seat can be adapted for a hermetic sealing of the opening, for example, also with at least one seal interposed.

In a first further development of the measuring system of the invention, such further comprises a tube insertable into the course of the pipeline and having a lumen, which is adapted to convey the fluid flowing in the pipeline, wherein the sensor is inserted into the tube in such a manner that the first surface of the deformation body faces the lumen of the tube and the sensor blade protrudes inwardly into the lumen.

In a first embodiment of the first further development of the measuring system, it is, furthermore, provided that the sensor blade has a length, measured as a minimum distance between a proximal end of the sensor blade, namely an end bordering on the deformation body, and a distal end of the sensor blade, namely an end remote from the deformation body, i.e. the surface of the deformation body, wherein the length is less than 95% of a caliber of the tube and/or greater than half of the caliber.

In a second embodiment of the first further development of the measuring system, it is, furthermore, provided that the overload protection apparatus has a length, measured as a minimum distance between a proximal end of the overload protection apparatus, namely an end bordering on the deformation body, and a distal end of the overload protection apparatus, namely an end remote from the deformation body, i.e. the surface of the deformation body, which length is less than 95% of a caliber of the tube and/or greater than half of the caliber.

In a second further development of the measuring system of the invention, such further comprises a tube insertable into the course of the pipeline and having a lumen, which is adapted to convey the fluid flowing in the pipeline, wherein an opening is embodied in the wall of the tube, especially an opening having a seat serving for mounting the deformation body on the wall, and wherein the sensor is inserted into the opening in such a manner that the deformation body covers the opening, especially hermetically seals it, and that the first surface of the deformation body faces the lumen of the tube, such that the sensor blade protrudes inwardly into the lumen.

In a first embodiment of the second further development of the measuring system, it is, furthermore, provided that the sensor blade has a length, measured as a minimum distance between a proximal end of the sensor blade, namely an end bordering on the deformation body, and a distal end of the sensor blade, namely an end remote from the deformation body, i.e. its surface, wherein the length is less than 95% of a caliber of the tube and/or greater than half of the caliber.

In a second embodiment of the second further development of the measuring system, it is, furthermore, provided that the overload protection apparatus has a length, measured as a minimum distance between a proximal end of the overload protection apparatus, namely an end bordering on the deformation body, and a distal end of the overload protection apparatus, namely an end remote from the deformation body, i.e. its surface, which length is less than 95% of a caliber of the tube and/or greater than half of the caliber.

In a third further development of the measuring system of the invention, such further comprises a bluff body arranged in the lumen of the tube and adapted to bring about a Kármán vortex street in the flowing fluid.

A basic idea of the invention is to provide for the sensor assembly of the invention a desired high nominal pressure resistance also in the case of highly asymmetric pressure loading of the sensor blade—especially asymmetric pressure loading, wherein the pressure fluctuations acting on the sensor blade, measured in the detection direction, have peak values of greater than 20 bar, namely a positive pressure of greater than 20 bar on the left side, first lateral surface of the sensor blade or with a positive pressure of greater than 20 bar on the right side, second lateral surface of the sensor blade—by limiting the maximum possible deflections of the sensor blade at least in the detection direction by means of an additional, overload protection apparatus at least sectionally surrounding the sensor blade. The invention is based, among other things, also on the surprising discovery that while the supplementally arranged overload apparatus, in comparison to conventional sensor assemblies, does, indeed, represent an extra flow obstruction, its influence on the accuracy of measurement, even in the case of design of the overload apparatus for the previously indicated high loadings, especially even in the case of condensation induced water hammers, is actually negligible.

An advantage of the invention is that it provides, not only in very simple, equally as well very effective, manner, a considerable improvement of the nominal pressure resistance of sensors of the type being discussed, but also that this can be achieved without thereby mentionably lessening the measuring sensitivity, namely the sensitivity of the sensor to the pressure fluctuations actually to be registered, or diminishing to an intolerable extent the typically required (especially in industrial application), high accuracy of measurement. A further advantage of the invention is additionally also that the sensor assembly of the invention can, in principle, be constructed in manner equal to that used for known sensor assemblies of conventional sensors and measuring system formed therewith. Moreover, the deformation body and the sensor blade of the sensor assembly of the invention can also, in principle, have the same construction and be manufactured of the same materials as conventional membranes and sensor blades.

The invention as well as advantageous embodiments thereof will now be explained in greater detail based on examples of embodiments, which are shown in the figures of the drawing. Equal, including equally acting or equally functioning, parts are provide in all figures with the equal reference characters; when perspicuity requires or it otherwise appears sensible, already mentioned reference characters are omitted in subsequent figures. Other advantageous embodiments or further developments, especially also combinations, of, firstly, only individually explained aspects of the invention, will become evident, furthermore, from the figures of the drawing and/or from the claims. The figures of the drawing show as follows:

DETAILED DISCUSSION IN CONJUNCTION WITH THE DRAWINGS

Figure 1:
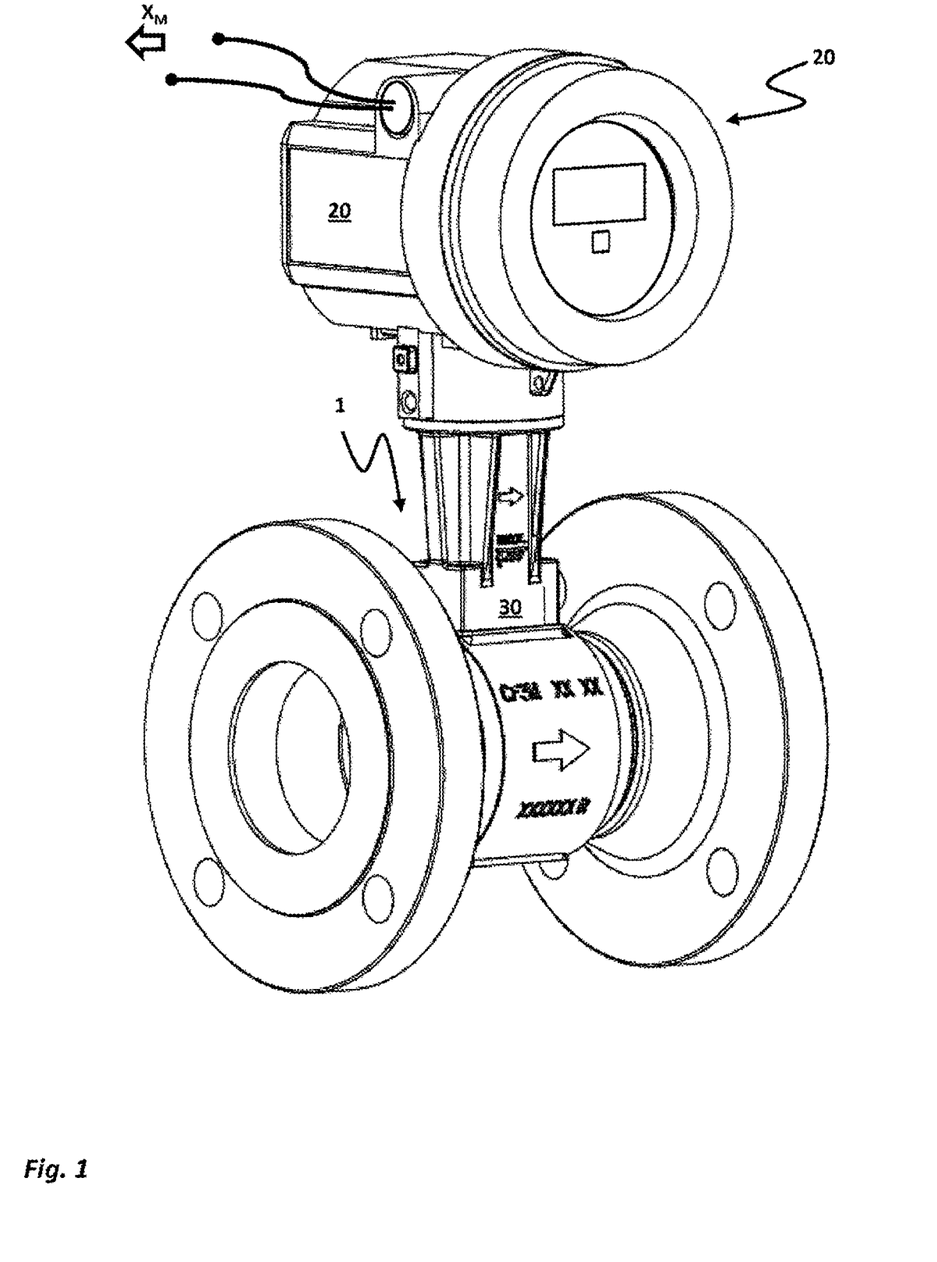
FIGS. 1, and 2 schematically illustrate in different views, a measuring system—here embodied as a vortex flow measuring device—with a sensor and a measuring electronics for measuring at least one flow parameter of a fluid flowing in a pipeline.
Figure 2:
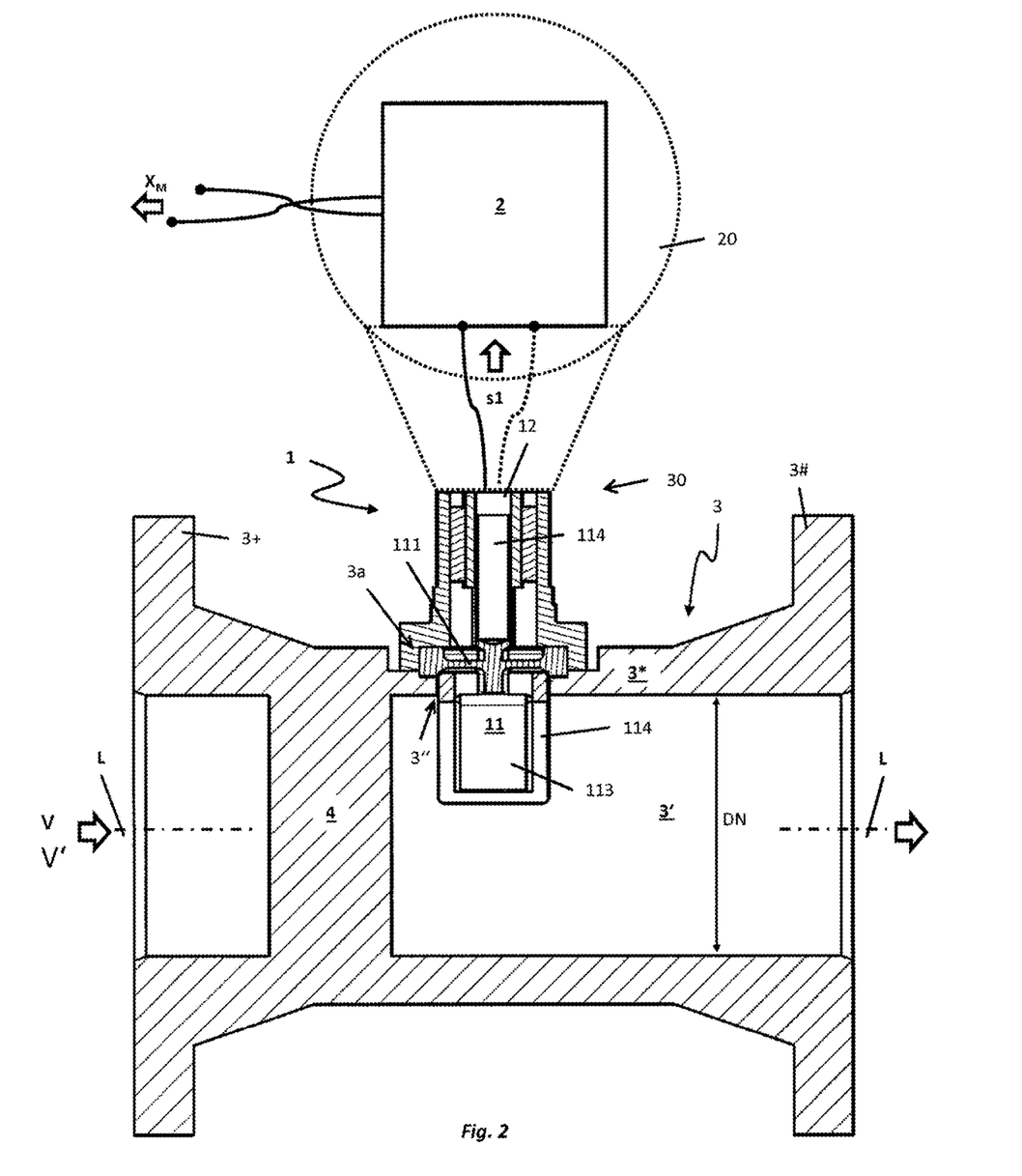
Figure 3A:
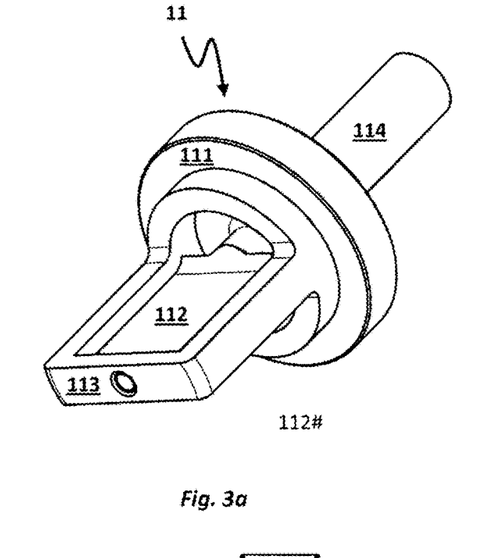
FIGS. 3a, 3b, 3c, and 3d are schematic, also partially sectioned, views of a (first variant) of a sensor assembly for a sensor, especially suitable for application in a measuring system according to FIG. 1, or 2.
Figure 3B:
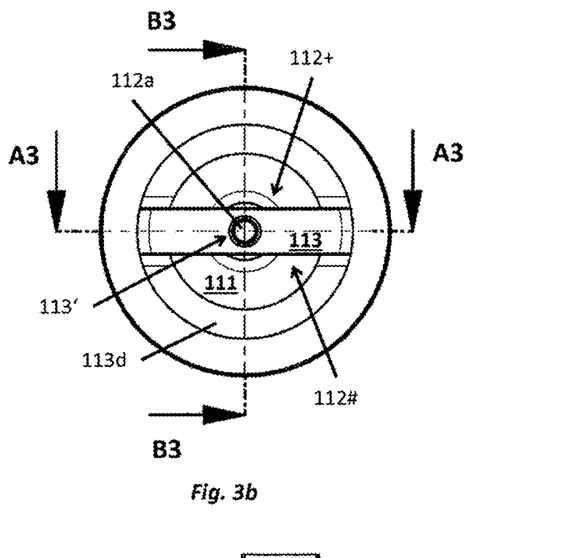
Figure 3C:
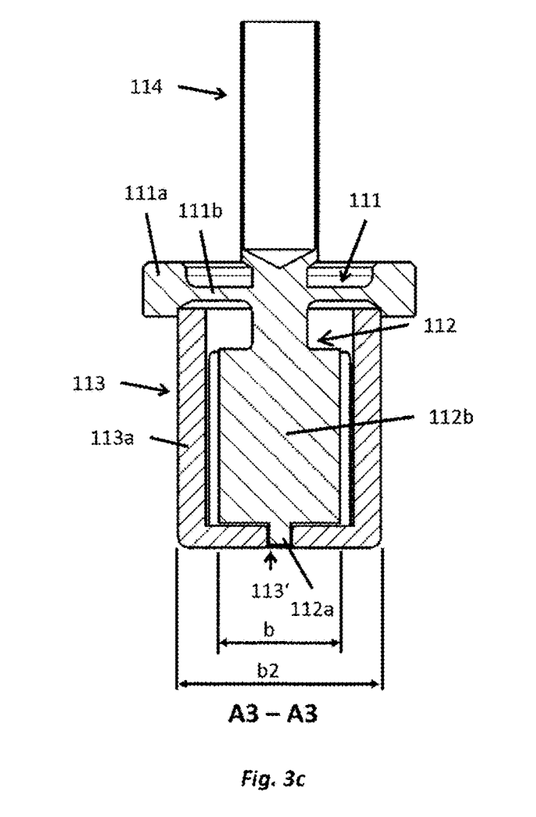
Figure 3D:
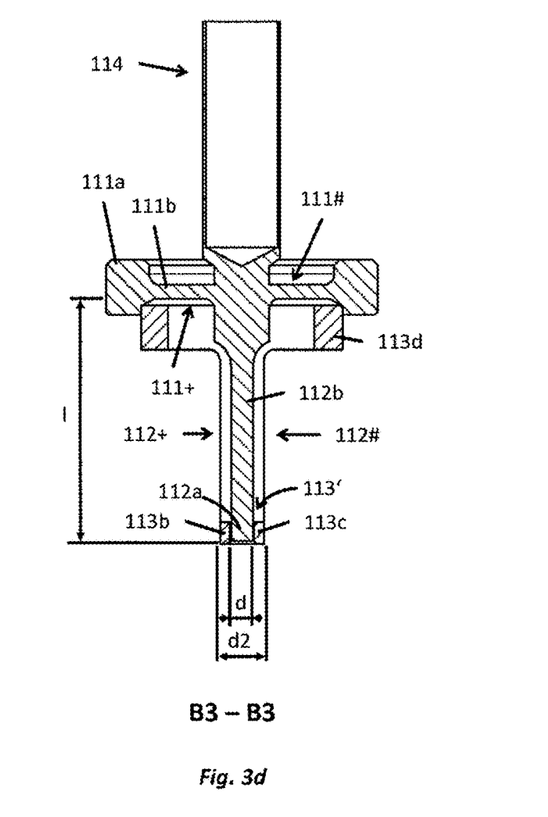
Figure 4A:
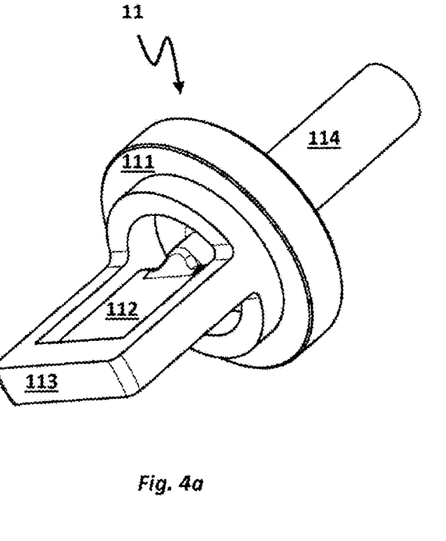
FIGS. 4a, 4b 4c, and 4d schematically illustrate in two different, sectioned, side views, a second variant of a sensor assembly for a sensor, especially suitable for application in a measuring system according to FIG. 1, or 2.
Figure 4B:
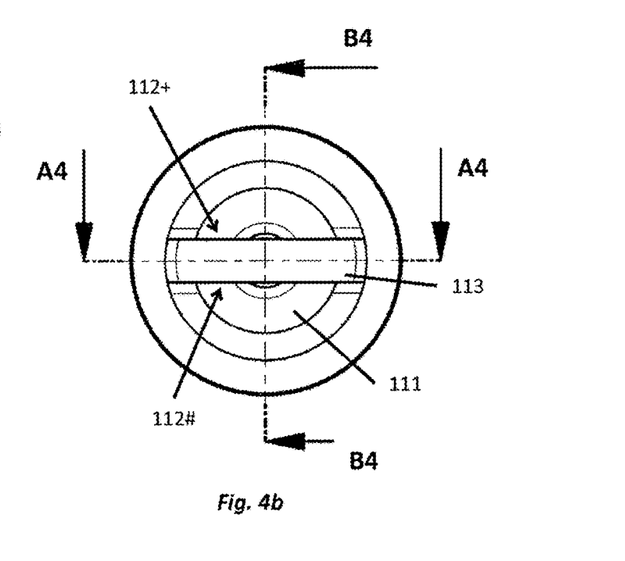
Figure 4C:
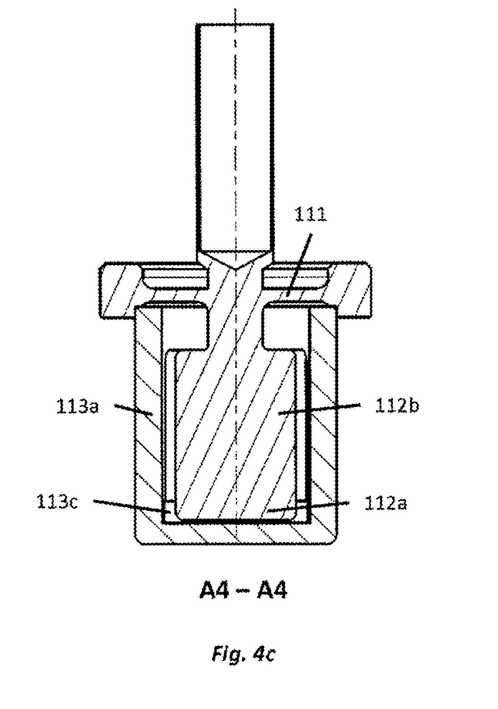
Figure 4D:
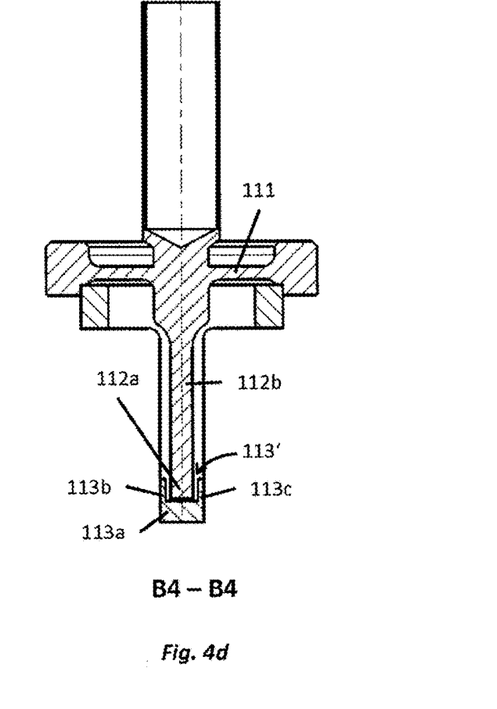
Figure 5A:
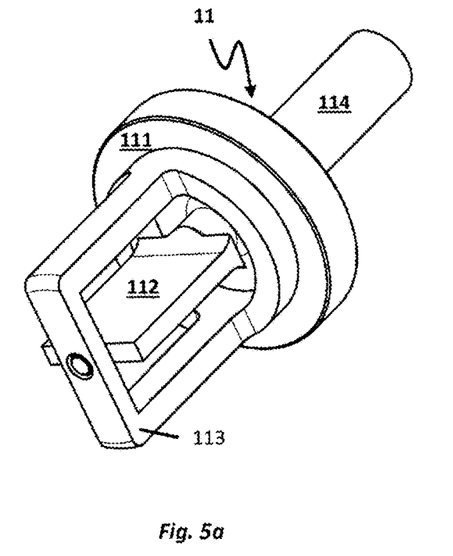
FIGS. 5a, 5b 5c, and 5d schematically illustrate in two different, sectioned, side views, a third variant of a sensor assembly for a sensor, especially suitable for application in a measuring system according to FIG. 1, or 2.
Figure 5B:
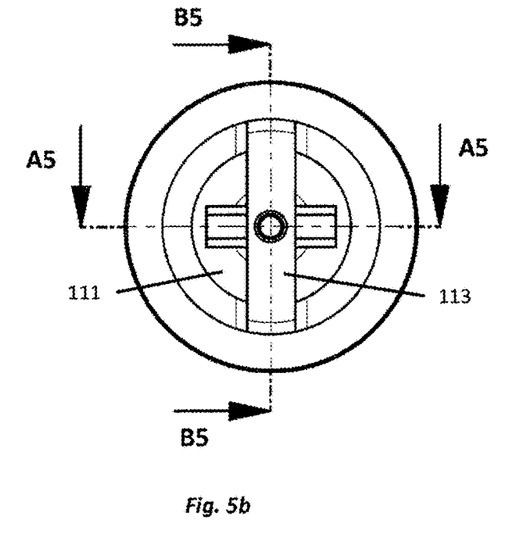
Figure 5C:
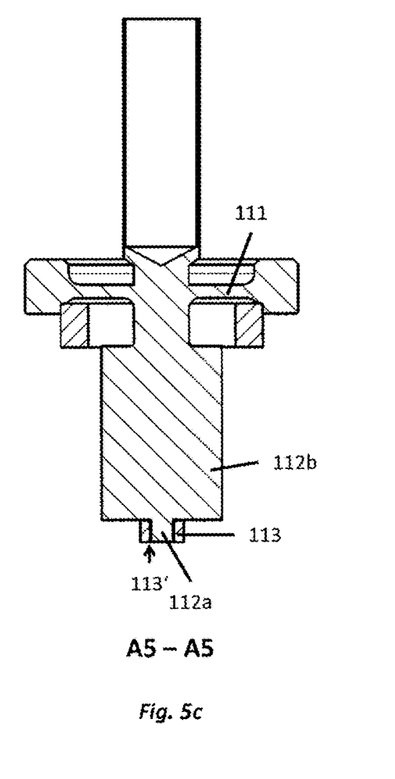
Figure 5D:
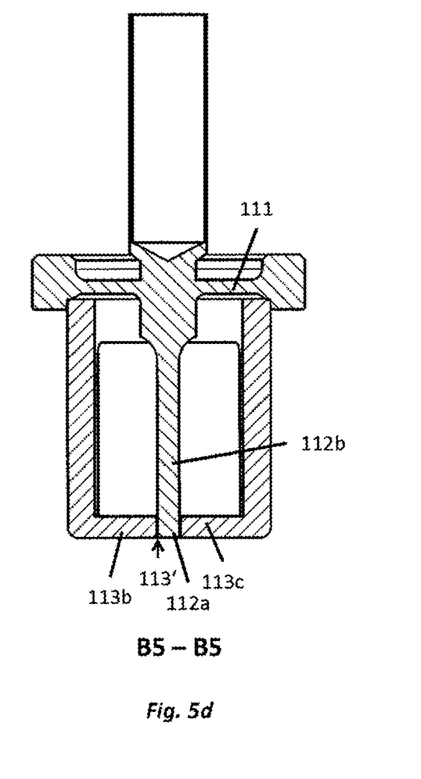
Figure 6A:
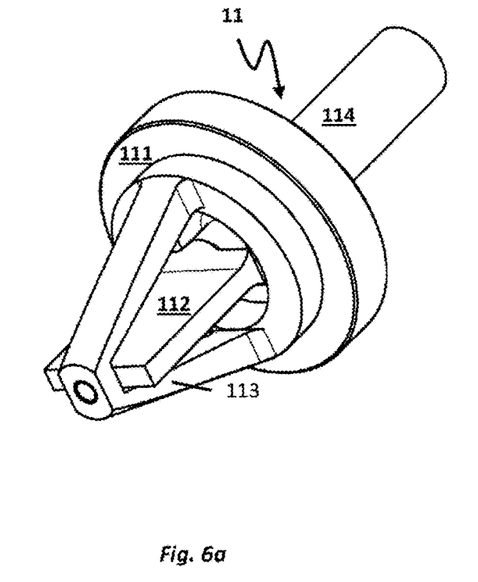
FIGS. 6a, 6b 6c, and 6d schematically illustrate in two different, sectioned, side views, a, fourth variant of a sensor assembly for a sensor, especially suitable for application in a measuring system according to FIG. 1, or 2.
Figure 6B:
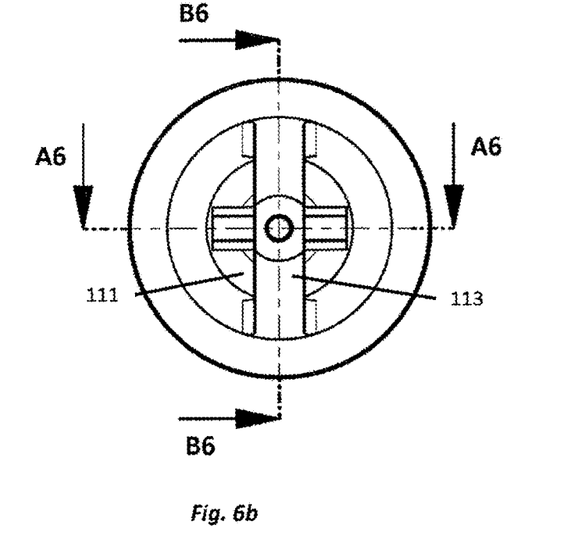
Figure 6C:
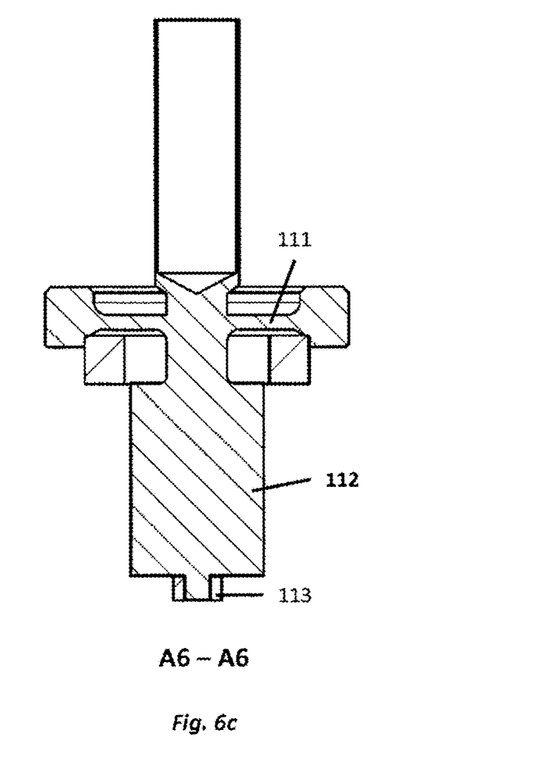
Figure 6D:
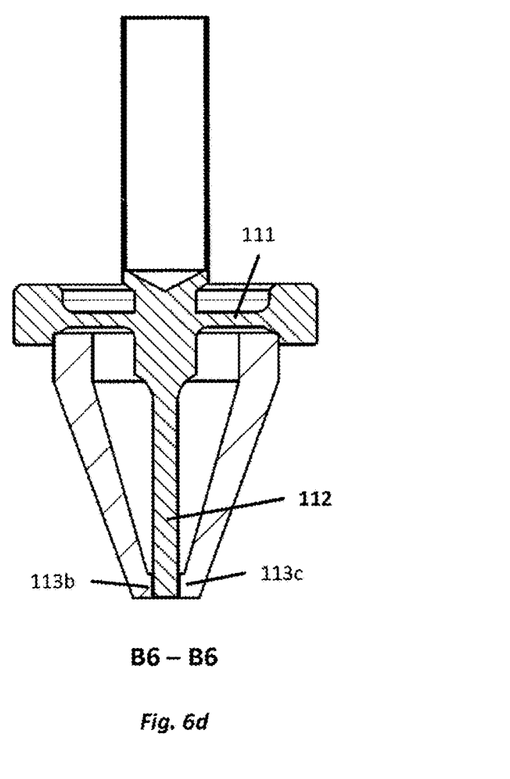
Figure 7A:
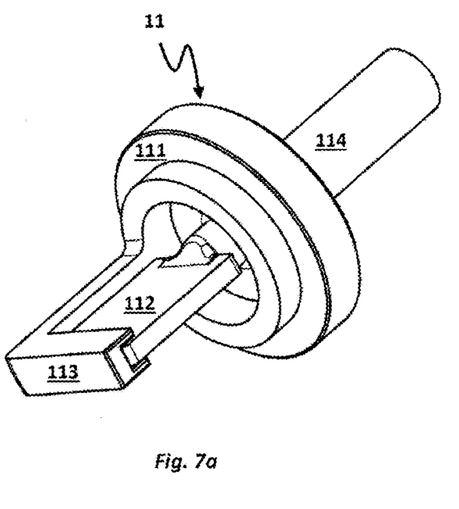
FIGS. 7a, 7b 7c, and 7d schematically illustrate in two different, sectioned, side views, a fifth variant of a sensor assembly for a sensor, especially suitable for application in a measuring system according to FIG. 1, or 2.
Figure 7B:
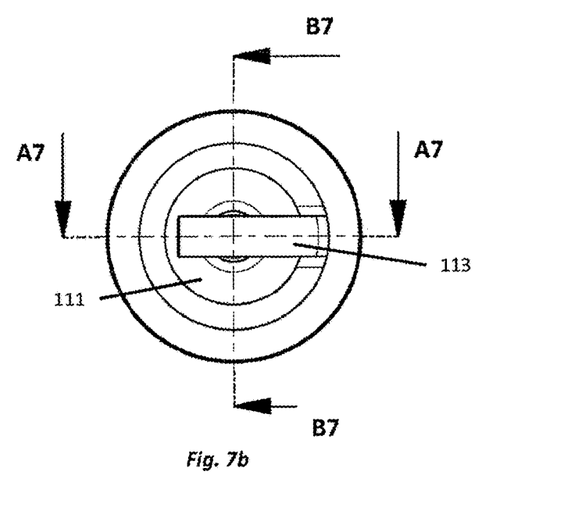
Figure 7C:
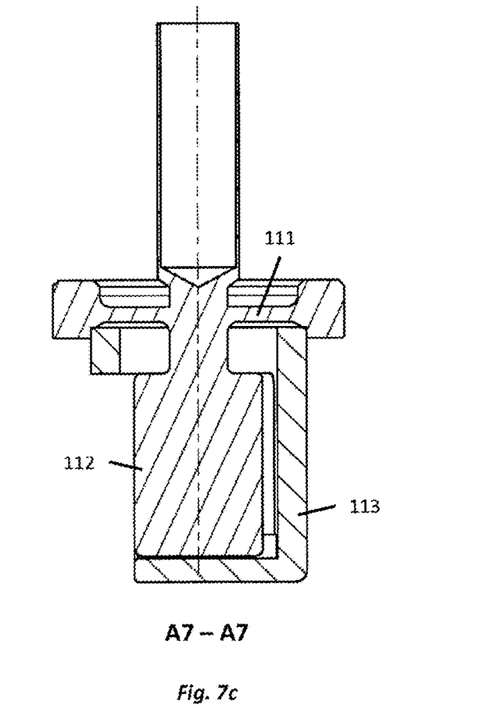
Figure 7D:
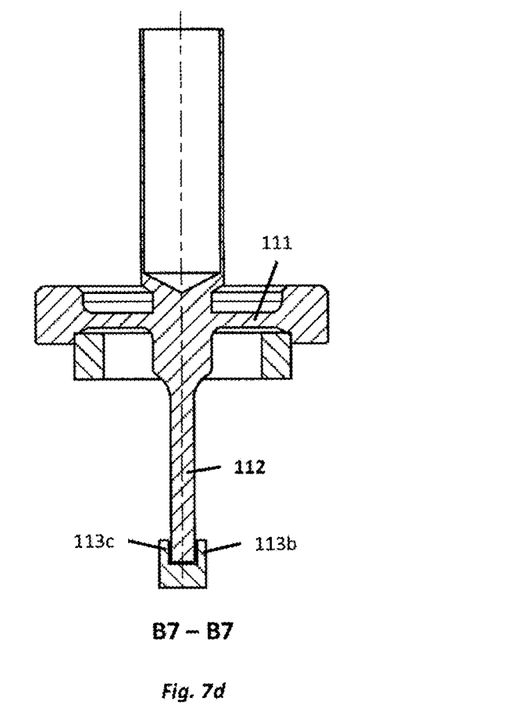

FIGS. 1 and 2 show an example of an embodiment for a measuring system for measuring at least one flow parameter, in given cases, also a flow parameter changeable as a function of time, such as e.g. a flow velocity v and/or a volume flow rate V', of a fluid flowing in a pipeline, for example, a hot gas, especially having at least at times a temperature of greater than 400° C., and/or at least at times a high pressure, especially greater than 140 bar. The pipeline can be embodied, for example, as a component of a heat supply network or a turbine circulatory system, such that the fluid can be, for example, steam, especially also saturated steam or superheated steam, or, for example, also condensate drained from a steam line. Fluid can be, however, for example, also a (compressed) natural gas or a biogas, such that the pipeline can be, for example, also component of a natural gas or a biogas plant or a gas supply grid.

The measuring system includes a sensor 1, which is provided, and embodied, to register pressure fluctuations in the fluid flowing in a principal flow direction past the sensor and to transduce such into a sensor signal s1, for example, an electrical or optical, sensor signal s1, corresponding to the pressure fluctuations. As evident from the combination of FIGS. 1 and 2, the measuring system comprises, furthermore, a measuring electronics 2—, for example, a measuring electronics 2 accommodated in a pressure—and/or shock resistant protective housing 20. Measuring electronics 2 is connected to the sensor 1 and communicates with the sensor 1 during operation of the measuring system. Measuring electronics 2 is adapted, especially, to receive the sensor signal s1 and to process such, for example, to generate measured values $X_M$ representing the at least one flow parameter, for example, thus flow velocity v, or volume flow rate V'. The measured values $X_M$ can, for example, be displayed on-site and/or transmitted—by wire via connected fieldbus and/or wirelessly per radio—to an electronic data processing system, for instance, a programmable logic control unit (PLC) and/or a process control station. The protective housing 20 for the measuring electronics 2 can be produced, for example, of a metal, for instance, a stainless steel or aluminum, and/or by means of a casting method, such as e.g. an investment casting—or a pressure casting method (HPDC); it can, however, for example, also be formed by means of a plastic formed part manufactured in an injection molding method.

Sensor 1 comprises, as well as also directly evident from FIG. 2 and FIGS. 3a, 3b, 3c, 3d, in each case, or from a combination of these figures, a sensor assembly 11, which is formed by means of an, especially membrane like, or disk shaped, deformation body 111 as well as a sensor blade 112 having a left side, first lateral surface 112+ as well as a right side, second lateral surface 112#. Sensor blade 112 extends from a first surface 111+ of the deformation body 111 to a distal (free) end, namely an end remote from the deformation body 111 and its surface 111+. Deformation body 111 includes, furthermore, a second surface 111# lying opposite the first surface 111+ and, for example, at least partially parallel to the first surface 111+, as well as an external edge segment 111a, for example, an annular, external edge segment 111a and/or an annular, external edge segment 111a equipped with a sealing surface. Outer edge segment 111a has a thickness, which—such as indicated in FIG. 2, or 3a, 3b, 3c, 3d—is significantly greater than a minimum thickness of an inner segment 111b enclosed by the edge segment 111a—here namely an inner segment 111b carrying the sensor blade 112.

Deformation body 111 and sensor blade 112 of the sensor assembly 11 of the invention are, especially, adapted, to be excited to execute oscillations, typically forced oscillations, about a shared static resting position, in such a manner that the sensor blade 112 executes in a detection direction—extending essentially transversely to the above-referenced principal flow direction—pendulum-like movements elastically deforming the deformation body 111. The sensor blade 112 has, accordingly, a breadth b (measured as a maximum extent in the direction of the principal flow direction), which is significantly greater than a thickness d of the sensor blade 112, measured as a maximum lateral extent in the direction of the detection direction. In the example of an embodiment illustrated in FIGS. 3a, 3b, 3c, 3d, the sensor blade 112 is additionally embodied essentially wedge shaped; it can, however, for example, also be embodied as a relatively thin, planar plate, such as quite usual in the case of such sensor assemblies, and sensors formed therewith.

Deformation body 111 and sensor blade 112 can, furthermore, be, for example, components of one and the same monolithic, formed part, which is produced, for example, by casting or by a generative method, such as, for instance, 3D laser melting; deformation body and sensor blade can, however, also be embodied as individual parts, firstly, separated from one another, and only subsequently connected together by material bonding, for example, welded, brazed or soldered together, and, consequently produced from materials correspondingly connectable together by material bonding. Deformation body 111 can—such as quite usual in the case of such sensor assemblies—be, at least partially, for example, predominantly or completely, of a metal, such as e.g. stainless steel, or a nickel based alloy. Likewise, also the sensor blade can at least partially be made of a metal, for example, a stainless steel, or a nickel based alloy; especially, the deformation body 111 and the sensor blade 112 can also be of the same material.

Besides the sensor assembly 11, the sensor comprises, furthermore, a transducer element 12—, for example, a transducer element 12 embodied as a piezoelectric transducer, a capacitive transducer element 12 embodied as a component of a capacitor, or an optical transducer element 12 embodied as a component of a photodetector—for generating a signal changing as a function of time—typically namely at least at times periodic—and representing movements of the sensor blade, and, equally, a signal changing as a function of time and representing deformations of the deformation body 111, here also a signal serving as a sensor signal, for example, in the form of a variable electrical voltage, or correspondingly modulated laser light, modulated by the previously indicated movements.

In an additional embodiment of the invention, the measuring system comprises, furthermore, a tube 3 insertable into the course of the previously indicated pipeline and having a lumen 3' enveloped by a—, for example, metal—wall 3* of the tube. Tube 3 extends from an inlet end 3+ to an outlet end 3# and is adapted to convey the fluid flowing in the pipeline. Sensor 1 is additionally inserted in the tube in such a manner that the first surface of the deformation body 111 faces the lumen 3' of the tube, consequently such that the sensor blade protrudes inwardly into the lumen. In the example of an embodiment shown here, there is provided on the inlet end 3+, as well as also on the outlet end 3#, furthermore, in each case, a flange serving for establishing a leak free flange connection with, in each case, a corresponding flange on an inlet—, and outlet, side, line segment of the pipeline. Furthermore, tube 3 can be embodied, such as in FIG. 1 or 2, to be essentially straight, for example, as a hollow cylinder with a circularly shaped cross section, in such a manner that the tube 3 has an imaginary, straight, longitudinal axis L imaginarily connecting the inlet end 3+ and the outlet end 3#. Sensor 1 is in the example of an embodiment shown in FIGS. 1 and 2 inserted from the exterior through an opening 3" formed in the wall into the lumen of the tube and affixed in the region of the opening—, for example, also releasably—externally on the wall 3*, and, indeed, such that the surface 111+ of the deformation body 111 faces the lumen 3' of the tube 3, such that the sensor blade 112 protrudes inwardly into the lumen. Especially, sensor 1 is so inserted into the opening 3" that the deformation body 111 covers the opening 3", and hermetically seals it. The opening can, for example, be so embodied that it—such as quite usual in the case of measuring systems of the type being discussed—has an (inner-) diameter, which lies in a range between 10 mm and about 50 mm.

In an additional embodiment of the invention, a seat 3a serving for mounting the deformation body on the wall 3* is embodied in the opening 3". Sensor 1 can, in such case, be affixed to the tube 3, for example, by material bonded connecting, especially by welding, soldering, or brazing, of deformation body 111 and wall 3*; it can, however, for example, also be connected releasably with the tube 3, for example, by a screwed attachment. Embodied in the seat 3a can be, furthermore, at least one sealing surface, for example, also a surrounding, or annular, sealing surface, which is adapted, by interacting with the deformation body 111 and a, in given cases, provided, for example, annular or washer-shaped, sealing element, correspondingly to seal the opening 3". Particularly for the case, in which the sensor assembly is to be inserted into the seat 3a and connected releasably with the tube 3, also the edge segment 111a of the deformation body 111 can, in advantageous manner, furthermore, be provided with a sealing surface, for example, a sealing surface corresponding with the sealing surface provided, in given cases, in the opening 3" and/or an annular sealing surface.

In the example of an embodiment shown here, the measuring system is especially embodied as a vortex flow measuring device having a bluff body 4 arranged in the lumen of the tube 3—here namely located upstream of the sensor 1—, and serving for effecting a Kármán vortex street in the flowing fluid. Sensor and bluff body are, in such case, especially, so dimensioned and arranged that the sensor blade 112 protrudes inwardly into such a region in the lumen 3* of the tube, and into the fluid conveyed therein, which is occupied during operation of the measuring system regularly by a (steady-state) Kármán vortex street, so that the pressure fluctuations registered by means of the sensor 1 are periodic pressure fluctuations caused by oppositely sensed vortices shed from the bluff body 4 with a shedding rate ($\sim 1/fv_{tx}$), and the sensor signal s1 has a signal frequency ($\sim fv_{tx}$) corresponding to the shedding rate of the vortices. In the example of an embodiment shown here, the vortex flow measuring device is additionally embodied as a measuring system in compact construction, in the case of which the measuring electronics 2 is accommodated in a protective housing 20 held on the tube—, for example, by means of a neck shaped connection nozzle 30.

In an additional embodiment of the invention, sensor 1 and tube 3 are, furthermore, so dimensioned that a length l of the sensor blade 112, measured as a minimum distance between a proximal end of the sensor blade 112, namely an end bordering on the deformation body 111, and the distal end of the sensor blade 112, is greater than half a caliber DN of the tube 3 and less than 95% of the caliber DN. The length l can, for example,—such as quite usual in the case of comparatively small calibers of less than 50 mm—also be so selected that the distal end of the sensor blade 112 has only a very small minimum distance from the wall 3* of the tube 3. In the case of tubes with comparatively large calibers of 50 mm or more, the sensor blade 112 can—such as quite usual in the case of measuring systems of the type being discussed, and as well as also evident from FIG. 2—, for example, also be embodied significantly shorter than half a caliber of the tube 3.

As already mentioned, the sensor assembly, the sensor formed therewith, and the measuring system formed therewith, are especially provided to be applied at measuring points, where momentarily extremely high dynamic pressures can occur in the fluid to be measured, for example, due to condensation induced water hammering (CIWH), in such a manner that the pressure fluctuations acting in the detection direction on the sensor 1 have peak values of greater than 20 bar, namely with a positive pressure of greater than 20 bar on the left side, first lateral surface of the sensor blade or with a positive pressure of greater than 20 bar on the right-side, second lateral surface of the sensor blade, along with correspondingly high asymmetric loadings of the sensor blade and the deformation body. For preventing overloading of the deformation body as a result of pressure fluctuations acting asymmetrically on the sensor blade, especially also with peak values of greater than 20 bar, or, associated therewith, plastic or otherwise irreversible deformation of the sensor assembly, especially of the deformation body, the sensor assembly 1 of the invention includes, as well as also schematically shown in FIGS. 2, 3c, 3d, in each case, furthermore, an overload protection apparatus 113 extending from the edge segment 111a to a distal end, namely an end remote from the edge segment 111a, and from the deformation body. Other variants of overload protection apparatus are also shown in FIGS. 4a-d, 5a-d, 6a-d, and 7a-d. The overload protection apparatus 113 is formed by means of a support stirrup 113a led with lateral separation around the sensor blade 112 as well as by means of two stops 113b, 113c for the sensor blade 112. Stops 113b, 113c are held by the support stirrup. Of the stops, a first stop 113b is placed on the left side of the sensor blade 112 and a second stop 113c on the right side of the sensor blade 112. The stops 113b, 113c are additionally so dimensioned and arranged that an intermediate space 113' formed therebetween receives only a selected, for example, edge, terminal and/or pin—, or plug shaped, first portion 112a of the sensor blade 112, equally as well does not receive, i.e. leaves free, a second portion 112b of the sensor blade 112 extending between the portion 112a and the first surface 111+ of the deformation body 111. Moreover, the deformation body 111 and the sensor blade 112 are adapted, in performing the previously indicated oscillations around the shared static resting position, to be moved relative to the overload protection apparatus 113 in such a manner that along with the pendulum-like movements of the sensor blade 112 executed in such case, its portion 112a located within the intermediate space 113' is moved alternately to the left, namely in the direction toward the first stop 113b, and to the right, namely in the direction toward the second stop 113c. The overload protection apparatus 113 can, for example, at least partially, especially., however, also predominantly or completely, be made of a metal, such as, for instance, a stainless steel, or a nickel based alloy. Additionally, advantageously also deformation body 111 and overload protection apparatus 113, in given cases, also the sensor blade, can be manufactured of the same material.

Furthermore, the two stops as well as the support stirrup can, for example, also be integral components of one and the same monolithic, formed part, for example, also in such a manner that the entire overload protection apparatus is formed by means of a single, monolithic, formed part. The monolithic, formed part can be, for example, a casting or a formed part, especially of a metal, manufactured by a generative method, such as e.g. 3D laser melting.

Deformation body 111 and overload protection apparatus 113 can, however, for example, be joined together, namely connected together by material bonding, especially be welded, or soldered, together. In an additional embodiment of the invention particularly helpful for joining deformation body 111 and overload protection apparatus 113 together, the overload protection apparatus 113 has a connecting element 113d on an end facing the edge segment 111a of the deformation body 111. The connecting element 113d can, such as, among other things, also directly evident from a combination of FIG. 3a-d, be, for example, ring-shaped. Additionally, the connecting element 113d and the edge segment 111a can be arranged such that they are coaxially. In an additional embodiment of the invention, the connecting element 113d and the edge segment 111a are additionally connected together by material bonding, especially welded together. Likewise, also the support stirrup 113a and the connecting element 113d can be connected together by material bonding, especially welded together; connecting element 113d and support stirrup 113a can, however, for example, also be integral components of one and the same, monolithic, formed part.

Deformation body 111, sensor blade 112 and overload protection apparatus 113 are, furthermore, so dimensioned and so arranged that, in the case of sensor blade together with the deformation body located in their shared static resting position, these contact neither the support stirrup, nor either of the stops. In order to assure that, on the one hand, the sensor blade (together with the deformation body) located in the static resting position actually contacts neither of the stops, and, on the other hand, the pendulum-like movements of the sensor blade 112 deforming the deformation body 111 elastically can nevertheless have a maximum deflection sufficient for registering the pressure fluctuations, i.e. for ascertaining a shedding rate of vortices causing periodic pressure fluctuations, the deformation body 111, the sensor blade 112 and the overload protection apparatus 113, according to an additional embodiment of the invention, are, furthermore, so dimensioned and arranged that, at least in the case of sensor blade located in the static resting position, a sufficiently large gap is formed between this and each of the two stops, especially in such a manner that each of the gaps has, in each case, a minimum gap breadth, which is greater than 0.02 mm. Moreover, it is, furthermore, provided that deformation body, sensor blade and overload protection apparatus are so dimensioned and arranged that, in the case of sensor blade located in the static resting position, a sufficiently large gap is formed between this and the support stirrup, especially in such a manner that the gap has a minimum gap breadth, which is greater than 0.02 mm, especially greater than 0.05 mm.

For the purpose of implementing a protection of the deformation body against plastic, i.e. irreversible, deformation, for instance, as a result of pressure fluctuations acting asymmetrically on the sensor blade, or a protection of the sensor assembly formed by means of the deformation body against destruction resulting from such pressure fluctuations, the deformation body 111, the sensor blade 112 and the overload protection apparatus 113 according to an additional embodiment of the invention are, furthermore, so dimensioned and arranged that, in the case of sensor blade located together with the deformation body 111 in a shared first end position differing from the shared static resting position, the sensor blade contacts the first stop 113b, especially, however, does not contact the support stirrup 113a. Moreover, the deformation body 111, the sensor blade 112 and the overload protection apparatus 113 according to an additional embodiment of the invention are additionally also so dimensioned and arranged that, in the case of sensor blade 112 located together with the deformation body in a shared second end position differing from the shared static resting position, as well as also from the shared first end position, the sensor blade contacts the second stop 113c, especially, however, does not contact the support stirrup 113a. Especially, the deformation body, the sensor blade and the overload protection apparatus are, furthermore, so dimensioned and arranged that both a deformation of the deformation body corresponding to the first end position as well as also a deformation of the deformation body corresponding to the second end position is elastic, especially linearly-elastic, so that the deformations effected by the pendulum-like movements of the sensor blade are completely reversible. This can be assured for sensor assemblies with typical dimensions in the case of the sensor blade and the deformation body, for example, directly by selecting the above-referenced gap formed in the case of sensor blade located in static resting position between such and the support stirrup to be less than 0.2 mm, as measured at least in the detection direction. Particularly for the purpose of forming a sufficiently large intermediate space 113', namely one enabling the previously indicated gap, the support stirrup 113 according to an additional embodiment of the invention is, furthermore, so embodied that it has a thickness d2, measured as a maximum lateral extent in the direction of the detection direction, which is not less than the above-referenced thickness d of the sensor blade 112. Alternatively or supplementally, the support stirrup 113 can also be so embodied that at least one of the two subsections of the support stirrup 113 carrying the stops 113b, 113c has the thickness d2 and/or that this subsection of the support stirrup 113 has a thickness, measured as a lateral extent in the detection direction, which is less than the thickness d of the sensor blade 112, equally as well greater than a thickness of the portion 112a of the sensor blade 112 accommodated by the intermediate space, measured as its lateral extent in the detection direction. Furthermore, the support stirrup 113a can have, for example, a square cross section, in such a manner that breadth b2 of the support stirrup 113a is, for instance, as large as its thickness d2, respectively, for instance, also lies in the order of magnitude of the thickness d of the sensor blade 112; the cross section can, however, also, for example, be rectangular shaped, such that the breadth b2 of the support stirrup 113a can also be selected somewhat greater or also somewhat less than its thickness d2, respectively the thickness d of the sensor blade 112.

In an embodiment of the invention, the support stirrup 113a is at least partially led on the rear side, here namely, in the principal flow direction, downstream of the sensor blade. Alternatively or supplementally, the support stirrup can at least partially be led also on the front side, here namely, in the principal flow direction, upstream of the sensor blade. In another embodiment of the invention, the overload protection apparatus 113 is so embodied and so arranged that the support stirrup 113a is led at least partially on the left side of the sensor blade 112 and/or that the support stirrup 113a is led at least partially on the right side of the sensor blade 112. The support stirrup 113a, and the overload protection apparatus 113 formed therewith, can accordingly, for example, be so embodied that the support stirrup 113a, such as directly evident, for instance, in FIGS. 3a-d, FIGS. 4a-d or FIGS. 5a-d, in each case, and from a combination of FIGS. 3a-d, 4a-d, and 5a-d, in each case, has an essentially U-shaped outline. Particularly for the case, in which the support stirrup 113a is led both on the left side of the sensor blade 112 as well as also on the right side of the sensor blade 112, the support stirrup 113a can, for example, also, as evident in FIGS. 6a-d, and their combination, have a V-shaped outline. For the other case, in which the support stirrup 113a is led partially on the rear side or partially on the front side of the sensor blade, the support stirrup can, such as, for instance, in FIG. 7a-d, also have an L-shaped outline.

For the purpose of forming the portion 112a of the sensor blade 112 accommodated by the intermediate space 113' of the overload protection apparatus 113, the sensor blade 112 includes, according to an additional embodiment of the invention, a projection, especially a cylindrical or cuboid-shaped projection, i.e. the portion 112a is formed by the projection. Additionally, the deformation body, the sensor blade and the overload protection apparatus are, as well as also evident from a combination of FIGS. 3a-d, FIGS. 5a-d or 6a-d, so dimensioned and arranged that the projection (112a) protrudes inwardly into the intermediate space 113' formed between the stops. A greatest diameter of the projection can, for example, be so selected that it corresponds, as well as also evident from a combination of FIGS. 3a-d, FIGS. 5a-d or 6a-d, for instance, to the thickness d. The diameter can, however, for example, also be selected less than the previously indicated thickness d of the sensor blade 112, for example, also such that the above-referenced thickness d2 of the support stirrup 113a can, in given cases, even be equal to or less than the thickness of the sensor blade.

In the case of this embodiment of the invention, the two stops 113b, 113c can, furthermore, be formed by edge segments of a recess provided in the support stirrup 113a and the intermediate space 113' by a lumen of the recess surrounded by the edge segments, in such a manner that the recess serves practically as a seat and the projection as a plug occupying the seat with sufficient play, namely play enabling the previously indicated pendulum-like movements of the sensor blade, respectively that recess and projection have a loose fit, for example, with noticeable to ample play relative to the fitting system "Standard Bore" (DIN EN ISO 286-2: 2010). The recess can, for example, be a passageway or bore provided in the support stirrup 113a; the recess can, however, for example, also be embodied as an elongated hole in the support stirrup, or as a blind hole in the support stirrup. In the case of the blind hole, an open end correspondingly faces the sensor blade 112 for the purpose of accommodating the projection. In another embodiment of the invention, it is provided that the recess forming the intermediate space 113', such as indicated, for example, also in FIGS. 4a-d, and FIGS. 7a-d, is essentially groove shaped, respectively essentially trough shaped. Moreover, the deformation body, the sensor blade and the overload protection apparatus can, as well as also evident from FIGS. 4a-d, and FIGS. 7a-d, in such case, furthermore, be so dimensioned and arranged that the recess provided in the support stirrup 113a, and the stops 113b, 113c formed therewith and the intermediate space 113' formed therewith, in each case, extend essentially over the entire breadth b of the sensor blade 112, and that the portion 112a of the sensor blade accommodated by the intermediate space 113' has a breadth corresponding to its breadth b.

For compensating forces and/or moments resulting from possible movements of the sensor assembly—, for instance, as a result of vibration of the above-referenced pipeline connected to the tube—, and for preventing undesired movements of the sensor blade, or of the deformation body 111, resulting therefrom, namely movements corrupting the sensor signal s1, the sensor assembly 11 includes, according to an additional embodiment of the invention, furthermore, a balancing body 114, for example, a rod-, plate- or sleeve-shaped, balancing body 114, extending from the second surface 111# of the deformation body 111. Balancing body 114 can additionally also serve as a holder for transducer element 12 or also as a component of the transducer element 12, for example, as a movable electrode of a capacitor forming the (capacitive) transducer element. The balancing body 114 can, for example, be of the same material as the deformation body and/or as the sensor blade, for example, a metal. For example, the balancing body 114 can namely be produced from a stainless steel, or a nickel based alloy. In an additional embodiment of the invention, deformation body 111 and balancing body 114 are connected together by material bonding, for example, welded, brazed or soldered together. Consequently, balancing body 114 and deformation body 111 can be manufactured of materials connectable together by material bonding. Alternatively, deformation body 111 and balancing body 114 can, however, also be components of one and the same monolithic, formed part, for example, also in such a manner that sensor blade 111, deformation body 112 and balancing body 114 are components of the formed part. Sensor blade 112 and balancing body 114 can, furthermore—, as well as also evident from FIGS. 3c and 3d—be arranged aligned with one another, in such a manner that a principal axis of inertia of the sensor blade 112 coincides with the lengthened principal axis of inertia of the balancing body 114. Alternatively or supplementally, the balancing body 114 and the deformation body 111 can additionally be so positioned and oriented relative to one another that a lengthened principal axis of inertia of the deformation body 111 coincides with a principal axis of inertia of the balancing body 114. Moreover, sensor blade 112, balancing body 114 and deformation body 111 can also so positioned and oriented relative to one another that—such as, for example, also evident from a combination of FIGS. 2, 3a, 3b, 3c and 3d—a principal axis of inertia of the sensor assembly 11 extends parallel both to a principal axis of inertia of the sensor blade 112 as well as also a principal axis of inertia of the balancing body 114, as well as also a principal axis of inertia of the deformation body 111 or coincides both with the principal axis of inertia of the sensor blade as well as also the principal axis of inertia of the balancing body, as well as also with the principal axis of inertia of the deformation body.

The invention claimed is:

1. A sensor assembly for a sensor, which sensor assembly comprises:
   a deformation body exhibiting a first surface, an oppositely lying, second surface and an outer edge segment;
   a sensor blade extending from said first surface of said deformation body to a distal end, exhibiting a left side, a first lateral surface and a right side, and a second lateral surface; and
   an overload protection apparatus extending from said outer edge segment of the deformation body to a distal end and serving for protection of said deformation body against plastic deformation, said overload protection apparatus including a support stirrup led with lateral separation around said sensor blade and said overload protection apparatus including two stops held by said support stirrup for limiting movement of said sensor blade, of which a first stop is located on the left side of said sensor blade, and a second stop is located on the right side of said sensor blade, wherein:
   said outer edge segment is adapted to be connected to a seat serving for mounting said deformation body on a wall of a tube in such a manner that said deformation body covers an opening provided in the wall of the tube and/or in such a manner that the first surface of said deformation body faces a lumen of the tube, such that said sensor blade protrudes inwardly into the lumen;
   said stops are so dimensioned and arranged that an intermediate space formed therebetween receives only a portion of said sensor blade;
   and said deformation body and said sensor blade are adapted to be excited to execute oscillations about a shared static resting position and, in such case, to be moved relative to said overload protection apparatus, in such a manner that the sensor blade executes pendulum-like movements elastically deforming the deformation body, in the case of which the portion of said sensor blade located within the intermediate space is moved alternately to the left, namely in the direction toward said first stop, and to the right, namely in the direction toward said second stop.

2. The sensor assembly as claimed in claim 1, wherein: said overload protection apparatus includes a connecting element on one end facing said edge segment of said deformation body.

3. The sensor assembly as claimed in claim 2, wherein: said connecting element as well as said support stirrup are integral components of one and the same monolithic, formed part.

4. The sensor assembly as claimed in claim 2, wherein: said support stirrup and connecting element are connected together.

5. The sensor assembly as claimed in claim 2, wherein: a connecting element of said overload protection apparatus and said outer edge segment of said deformation body are connected together.

6. The sensor assembly as claimed in claim 1, wherein: said deformation body, said sensor blade and said overload protection apparatus are so dimensioned and arranged that, in the case of said sensor blade located together with said deformation body in a shared static resting position, said sensor blade contacts neither said support stirrup nor either of said stops.

7. The sensor assembly as claimed in claim 1, wherein: said deformation body, said sensor blade and said overload protection apparatus are so dimensioned and arranged that, in the case of said sensor blade together with said deformation body located in a shared static resting position, gaps are formed between said sensor blade and each of said two stops.

8. The sensor assembly as claimed in claim 1, wherein: said deformation body, said sensor blade and said overload protection apparatus are so dimensioned and arranged that, in the case of said sensor blade together with said deformation body located in a shared static resting position, a gap is formed between said sensor blade and said support stirrup.

9. The sensor assembly as claimed in claim 1, wherein: said deformation body, said sensor blade and said overload protection apparatus are so dimensioned and arranged that, in the case of said sensor blade together with said deformation body located in a shared first end position differing from the shared static resting position, said sensor blade contacts said first stop.

10. The sensor assembly as claimed in claim 9, wherein: said deformation body, said sensor blade and said overload protection apparatus are so dimensioned and arranged that, in the case of said sensor blade together with said deformation body located in a shared second end position differing from the shared static resting position, as well as also from the shared first end position, the sensor blade contacts said second stop.

11. The sensor assembly as claimed in claim 10, wherein:
said deformation body, said sensor blade and said overload protection apparatus are so dimensioned and arranged that both a deformation of said deformation body corresponding to the first end position as well as also a deformation of said deformation body corresponding to the second end position are elastic.

12. The sensor assembly as claimed in claim 1, wherein:
said sensor blade has a projection; and
said deformation body, said sensor blade and said overload protection apparatus are so dimensioned and arranged that said projection protrudes inwardly into the intermediate space formed between said stops.

13. The sensor assembly as claimed in claim 12, wherein:
said stops are provided by edge segments of a recess in said support stirrup, and said intermediate space is formed by a lumen of the recess surrounded by said edge segments.

14. The sensor assembly as claimed in claim 1, wherein:
said deformation body and said overload protection apparatus are connected together by material bonding; and/or
said deformation body and said sensor blade are connected together by material bonding.

15. The sensor assembly as claimed in claim 1, wherein:
said overload protection apparatus is composed at least partially; and/or
said deformation body and said overload protection apparatus are composed of the same material; and/or
said deformation body and said overload protection apparatus are components of one and the same, monolithic, formed part.

16. The sensor assembly as claimed in claim 1, wherein:
said support stirrup is led at least partially on a left side of said sensor blade; and/or
said support stirrup is led at least partially on a right side of said sensor blade; and/or
said support stirrup is led at least partially on a front side of said sensor blade; and/or
said support stirrup is led at least partially on a rear side of said sensor blade; and/or
said overload protection apparatus is formed by means of a single, monolithic, formed part; and/or
said first stop, said second stop as well as said support stirrup are integral components of one and the same monolithic, formed part; and/or
said stops are at least partially formed by edge segments of a recess provided in said support stirrup; and/or
said intermediate space is at least partially formed by a lumen of a recess provided in said support stirrup.

17. The sensor assembly as claimed in claim 1, wherein:
said outer edge segment is adapted to be connected to the seat by material bonding and/or hermetically sealed; and/or
at least one sealing surface is embodied in said outer edge segment.

18. The sensor assembly as claimed in claim 1, wherein:
said deformation body is composed at least partially of a metal especially a stainless steel, or a nickel based alloy; and/or
said sensor blade is composed at least partially of a metal; and/or
said deformation body and said sensor blade are composed of the same material; and/or
said deformation body and said sensor blade are components of one and the same monolithic, formed part.

19. The sensor assembly as claimed in claim 1, wherein:
said support stirrup is U-shaped.

20. The sensor assembly as claimed in claim 1, wherein:
said support stirrup is V-shaped.

21. The sensor assembly as claimed in claim 1, wherein:
said support stirrup is L-shaped.

22. A sensor for registering pressure fluctuations in a flowing fluid, which sensor comprises:
a sensor assembly including: a deformation body exhibiting a first surface, an oppositely lying, second surface, and an outer edge segment;
a sensor blade extending from said first surface of said deformation body to a distal end, exhibiting a left side, a first lateral surface and a right side, and a second lateral surface; and
an overload protection apparatus extending from said outer edge segment of the deformation body to a distal end and serving for protection of said deformation body against plastic deformation, said overload protection apparatus including a support stirrup led with lateral separation around said sensor blade and said overload protection apparatus including two stops held by said support stirrup for limiting movement of said sensor blade, of which a first stop is located on the left side of said sensor blade, and a second stop is located on the right side of said sensor blade, wherein: said stops are so dimensioned and arranged that an intermediate space formed therebetween receives only a portion of said sensor blade;
said outer edge segment is adapted to be connected to a seat serving for mounting said deformation body on a wall of a tube in such a manner that said deformation body covers an opening provided in the wall of the tube and/or in such a manner that the first surface of said deformation body faces a lumen of the tube, such that said sensor blade protrudes inwardly into the lumen,
and said deformation body and said sensor blade are adapted to be excited to execute oscillations about a shared static resting position and, in such case, to be moved relative to said overload protection apparatus, in such a manner that the sensor blade executes pendulum-like movements elastically deforming the deformation body, in the case of which the portion of said sensor blade located within the intermediate space is moved alternately to the left, namely in the direction toward said first stop, and to the right, namely in the direction toward said second stop;
as well as a transducer element for generating a sensor signal representing movements of said sensor blade changing as a function of time and/or deformations of said deformation body changing as a function of time.

23. The measuring system for measuring at least one flow parameter, which measuring system comprises:
a tube insertable into the course of the pipeline and having a lumen, which is adapted to convey the fluid flowing in the pipeline, and
a sensor for registering pressure fluctuations in the flowing fluid, which sensor comprises:
a sensor assembly including:
a deformation body exhibiting a first surface, an oppositely lying, second surface and an outer edge segment;
a sensor blade extending from said first surface of said deformation body to a distal end, exhibiting a left side, a first lateral surface and a right side, and a second lateral surface; and
an overload protection apparatus extending from said outer edge segment of the deformation body to a distal end and serving for protection of said deformation body against plastic deformation, said overload protection apparatus including a support stirrup led with lateral separation around said sensor blade and said overload protection apparatus including two stops held by said support stirrup for limiting movement of said sensor blade, of which a first stop is located on the left side of said sensor blade, and a second stop is located on the right side of said sensor blade, wherein: said stops are so dimensioned and arranged that an intermediate space formed therebetween receives only a portion of said sensor blade;

said deformation body and said sensor blade are adapted to be excited to execute oscillations about a shared static resting position and, in such case, to be moved relative to said overload protection apparatus, in such a manner that the sensor blade executes pendulum-like movements elastically deforming the deformation body, in the case of which the portion of said sensor blade located within the intermediate space is moved alternately to the left, namely in the direction toward said first stop, and to the right, namely in the direction toward said second stop;

as well as a transducer element for generating a sensor signal representing movements of said sensor blade changing as a function of time and/or deformations of said deformation body changing as a function of time;

as well as a measuring electronics, which is adapted to receive and to process the sensor signal; wherein the sensor is inserted into the tube in such a manner that the first surface of said deformation body faces the lumen of the tube and said sensor blade protrudes inwardly into the lumen.

24. The measuring system as claimed in claim 23, wherein:
an opening is embodied in the wall of the tube; and
said sensor is inserted into the opening in such a manner that said deformation body covers the opening and the first surface of said deformation body faces the lumen of the tube, such that said sensor blade protrudes inwardly into the lumen.

25. The measuring system as claimed in claim 24, wherein: the opening exhibits a seat serving for mounting said deformation body on the wall.

26. The measuring system as claimed in claim 25, wherein:
at least one sealing surface is embodied in the seat sealing surface.

27. The measuring system as claimed in claim 26, wherein;
at least one sealing surface is embodied in the edge segment sealing surface; and
said sealing surface and the sealing surface of the seat are adapted for hermetically sealing the opening.

28. The measuring system as claimed in claim 24, wherein the sensor is inserted into the opening in such a manner that said deformation body hermetically seals the opening.

29. The measuring system as claimed in claim 23, wherein:
said sensor blade shows a length, measured as a minimum distance between a proximal end of said sensor blade, namely an end bordering on said deformation body, and a distal end of said sensor blade, namely an end remote from said deformation body, which length is less than 95% of a caliber of the tube and/or greater than half of the caliber; and/or
said overload protection apparatus shows a length, measured as a minimum distance between a proximal end of said overload protection apparatus, namely an end bordering on said deformation body, and a distal end of said overload protection apparatus, namely an end remote from said deformation body, which length is less than 95% of a caliber of the tube and/or greater than half of the caliber.

30. The measuring system as claimed in claim 23, further comprising: a bluff body arranged in the lumen of the tube and adapted to bring about a Kármán vortex street in the flowing fluid.

31. The use of a measuring system as claimed in claim 23, for measuring a flow parameter flowing in a pipeline and at least at times showing a temperature of greater than 400° C. and/or at least at times acting with a pressure of greater than 140 bar on the deformation body and/or the sensor blade of the sensor.

* * * * *